US012718329B2

(12) United States Patent
Kim et al.

(10) Patent No.: US 12,718,329 B2
(45) Date of Patent: Aug. 25, 2026

(54) FLICKER SUPPRESSION WITHOUT MOTION ESTIMATION FOR SINGLE-IMAGE SUPER-RESOLUTION

(71) Applicant: Samsung Electronics Co., Ltd., Suwon-si (KR)

(72) Inventors: Joonsoo Kim, Irvine, CA (US); Tien C. Bau, Irvine, CA (US); Kamal Jnawali, Chantilly, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 18/528,241

(22) Filed: Dec. 4, 2023

(65) Prior Publication Data

US 2025/0029210 A1 Jan. 23, 2025

Related U.S. Application Data

(60) Provisional application No. 63/527,913, filed on Jul. 20, 2023.

(51) Int. Cl.
*G06T 5/50* (2006.01)
*G06T 3/4053* (2024.01)
*G06T 5/40* (2006.01)

(52) U.S. Cl.
CPC .............. *G06T 5/50* (2013.01); *G06T 3/4053* (2013.01); *G06T 5/40* (2013.01); *G06T 2207/20221* (2013.01)

(58) Field of Classification Search
None
See application file for complete search history.

(56) References Cited

U.S. PATENT DOCUMENTS 9,536,335 B2 1/2017 Abdollahian et al.
9,875,423 B2 1/2018 Miwa
9,996,908 B2 6/2018 Hiasa
10,342,499 B2 7/2019 Fukuda
(Continued)

FOREIGN PATENT DOCUMENTS

CN 115456873 A 12/2022

OTHER PUBLICATIONS

International Search Report and Written Opinion of the International Searching Authority dated Jul. 1, 2024 in connection with International Patent Application No. PCT/KR2024/004166, 9 pages.
(Continued)

*Primary Examiner* — Nancy Bitar

(57) ABSTRACT

A method includes obtaining a first image and a second image, where the second image represents a super-resolution version of the first image. The method also includes generating a third image representing a higher-resolution version of the first image. The method further includes performing flicker detection based on the third image and the second image in order to identify one or more flicker regions. The method also includes performing frequency decomposition of the third image to generate first decomposed images and of the second image to generate second decomposed images. In addition, the method includes blending portions of at least some of the first and second decomposed images based on the one or more identified flicker regions to generate a flicker-suppressed image.

20 Claims, 5 Drawing Sheets

(56) References Cited

U.S. PATENT DOCUMENTS

| | | | | |
|---|---|---|---|---|
| 10,621,695 | B2 | 4/2020 | Schroers et al. | |
| 10,970,827 | B2 * | 4/2021 | Lijima | G06T 11/001 |
| 11,615,510 | B2 | 3/2023 | Choi et al. | |
| 2009/0238535 | A1 * | 9/2009 | Robertson | G06T 3/4053<br>386/335 |
| 2018/0336662 | A1 | 11/2018 | Kimura | |
| 2019/0130530 | A1 | 5/2019 | Schroers et al. | |
| 2020/0145697 | A1 * | 5/2020 | Zhang | H04N 19/61 |
| 2020/0175660 | A1 * | 6/2020 | Iijima | G06T 5/50 |
| 2020/0314316 | A1 | 10/2020 | Hagenburg | |
| 2021/0224951 | A1 | 7/2021 | Ahn et al. | |
| 2021/0281878 | A1 | 9/2021 | Chan et al. | |
| 2022/0122223 | A1 | 4/2022 | Choi et al. | |
| 2023/0057261 | A1 | 2/2023 | Liu et al. | |
| 2023/0095237 | A1 | 3/2023 | Kim et al. | |

OTHER PUBLICATIONS

Moshe, “Post-processing for flicker reduction in H.264/AVC,” ResearchGate Article, Jan. 2007, 5 pages.

Yan et al., “Frame and Feature-Context Video Super-Resolution,” arXiv:1909.13057v1 [cs.CV], Sep. 2019, 9 pages.

Sajjadi et al., “Frame-Recurrent Video Super-Resolution,” arXiv:1801.04590v4 [cs.CV], Mar. 2018, 9 pages.

Chu et al., “Learning Temporal Coherence via Self-Supervision for GAN-based Video Generation,” arXiv:1811.09393v4 [cs.CV], May 2020, 19 pages.

Supplementary European Search Report dated Mar. 12, 2026 in connection with European Patent Application No. 24843227.0, 9 pages.

Villar-Corrales et al., “Deep Learning Architectural Designs for Super-Resolution of Noisy Images,” IEEE International Conference on Acoustics, Speech and Signal Processing, Jun. 2021, 5 pages.

* cited by examiner

FLICKER SUPPRESSION WITHOUT MOTION ESTIMATION FOR SINGLE-IMAGE SUPER-RESOLUTION

CROSS-REFERENCE TO RELATED APPLICATION AND PRIORITY CLAIM

This application claims priority under 35 U.S.C. § 119(e) to U.S. Provisional Patent Application No. 63/527,913 filed on Jul. 20, 2023. This provisional application is hereby incorporated by reference in its entirety.

TECHNICAL FIELD

This disclosure relates generally to image processing systems. More specifically, this disclosure relates to flicker suppression without motion estimation for single-image super-resolution.

BACKGROUND

Single-image super-resolution (SISR) refers to an image processing task in which an input image is processed in order to increase the resolution of its image data and generate a super-resolution image having a higher resolution. Ideally, the super-resolution image appears clearer and includes finer details relative to the input image. Often times, deep learning neural networks or other deep learning machine learning models are used to perform single-image super-resolution. These machine learning models can be easily trained to perform single-image super-resolution, such as by providing a machine learning model with lower-resolution training images and training the machine learning model to produce super-resolution images based on the training images.

SUMMARY

This disclosure relates to flicker suppression without motion estimation for single-image super-resolution.

In a first embodiment, a method includes obtaining a first image and a second image, where the second image represents a super-resolution version of the first image. The method also includes generating a third image representing a higher-resolution version of the first image. The method further includes performing flicker detection based on the third image and the second image in order to identify one or more flicker regions. The method also includes performing frequency decomposition of the third image to generate first decomposed images and of the second image to generate second decomposed images. In addition, the method includes blending portions of at least some of the first and second decomposed images based on the one or more identified flicker regions to generate a flicker-suppressed image.

In a second embodiment, an electronic device includes at least one processing device configured to obtain a first image and a second image, where the second image represents a super-resolution version of the first image. The at least one processing device is also configured to generate a third image representing a higher-resolution version of the first image. The at least one processing device is further configured to perform flicker detection based on the third image and the second image in order to identify one or more flicker regions. The at least one processing device is also configured to perform frequency decomposition of the third image to generate first decomposed images and of the second image to generate second decomposed images. In addition, the at least one processing device is configured to blend portions of at least some of the first and second decomposed images based on the one or more identified flicker regions to generate a flicker-suppressed image.

In a third embodiment, a non-transitory machine readable medium contains instructions that when executed cause at least one processor of an electronic device to obtain a first image and a second image, where the second image represents a super-resolution version of the first image. The non-transitory machine readable medium also contains instructions that when executed cause the at least one processor to generate a third image representing a higher-resolution version of the first image. The non-transitory machine readable medium further contains instructions that when executed cause the at least one processor to perform flicker detection based on the third image and the second image in order to identify one or more flicker regions. The non-transitory machine readable medium also contains instructions that when executed cause the at least one processor to perform frequency decomposition of the third image to generate first decomposed images and of the second image to generate second decomposed images. In addition, the non-transitory machine readable medium contains instructions that when executed cause the at least one processor to blend portions of at least some of the first and second decomposed images based on the one or more identified flicker regions to generate a flicker-suppressed image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
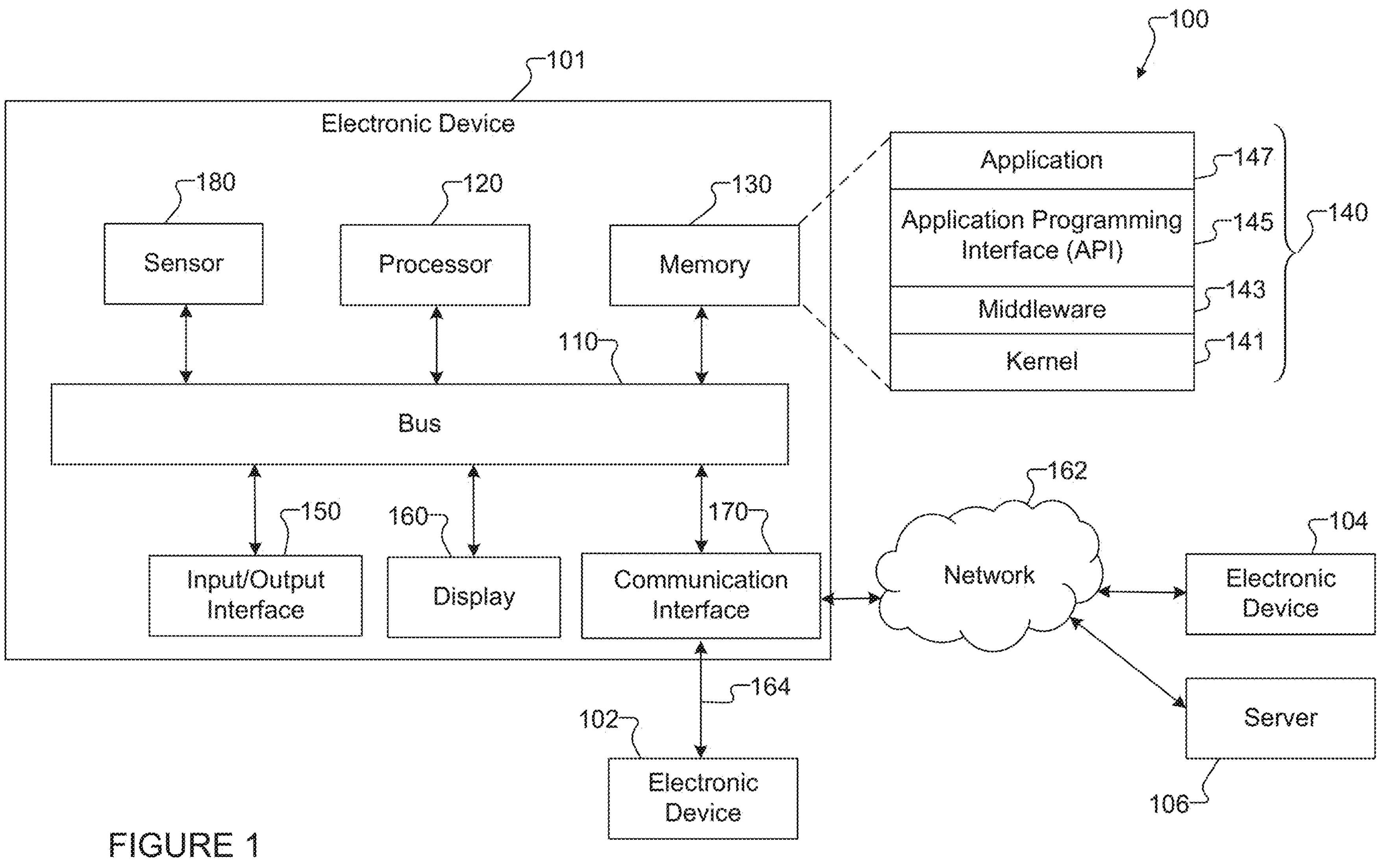
FIG. 1 illustrates an example network configuration including an electronic device in accordance with this disclosure.

FIGS. 1 through 5, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, single-image super-resolution (SISR) refers to an image processing task in which an input image is processed in order to increase the resolution of its image data and generate a super-resolution image having a higher resolution. Ideally, the super-resolution image appears clearer and includes finer details relative to the input image. Often times, deep learning neural networks or other deep learning machine learning models are used to perform single-image super-resolution. These machine learning models can be easily trained to perform single-image super-resolution, such as by providing a machine learning model with lower-resolution training images and training the machine learning model to produce super-resolution images based on the training images.

While deep learning machine learning models can be applied effectively when processing single images, the deep learning machine learning models can suffer from various issues when processing sequences of images, such as when processing images of a video sequences. In these or other instances, the deep learning machine learning models can generate flicker artifacts, which refer to temporal artifacts and are easily noticeable to users. Various approaches have been developed for reducing the generation of flicker artifacts. However, these approaches are generally motion-based compensation techniques, which means that these approaches identify motion between consecutive images and use the identified motion to reduce the generation of flicker artifacts. These approaches are based on the fact that flicker artifacts are typically the result of inconsistencies between image pixels in the temporal domain, so one or more motion-compensated previous images can be blended with a current image in order to smooth the temporal inconsistencies.

Unfortunately, these approaches need to perform motion estimation in order to identify motion vectors for each pixel in an image. Motion estimation can have high computational complexity, and motion estimation can require the use of additional image buffers in order to store previous images for use. As a result, it can be difficult if not impossible to implement motion-based flicker compensation on more resource-constrained devices. Moreover, motion-based flicker compensation is highly dependent on the accuracy of the motion estimation. If the motion estimation is not correct, it can easily result in the creation of other motion artifacts or can fail to suppress flickering.

This disclosure provides various techniques for flicker suppression without motion estimation for single-image super-resolution. As described in more detail below, a first image and a second image can be obtained, where the second image represents a super-resolution version of the first image. In some cases, the first image may represent an image from a video sequence, and the second image may represent a super-resolution version of the first image that has a higher resolution and contains improved detail compared to the first image. A third image can be generated, where the third image represents a higher-resolution version of the first image. In some cases, the third image may be generated by applying bicubic upsampling or other upsampling to the first image, and the third image may have the same resolution as the second image. Flicker detection can be performed based on the third image and the second image in order to identify one or more flicker regions. Each flicker region can represent a portion of the second image where one or more flicker artifacts may have been created. In some cases, the one or more flicker regions can be identified by comparing local image structures in the third and second images, such as by using histograms of oriented gradients associated with the third image and the second image. Here, the one or more flicker regions may be identified without using motion information between different images, such as without using motion information between the first image and a preceding image. Frequency decomposition of the third image can be performed to generate first decomposed images, and frequency decomposition of the second image can be performed to generate second decomposed images. In some cases, this can be done by performing residual filtering. Portions of at least some of the first and second decomposed images can be blended based on the one or more identified flicker regions in order to generate a flicker-suppressed image. The blending based on the one or more identified flicker regions can allow the flicker-suppressed image to retain at least some details of the second image that are not present in the third image.

In this way, the described techniques can provide flicker compensation without requiring the use of motion estimation. That is, the flicker compensation can be provided without requiring an estimate of the motion that occurs between different images. In some embodiments, this can be achieved by analyzing the second and third images, which are both based on the first image, such as when the second and third images are analyzed using the histograms of oriented gradients. This analysis can be based on the assumption that details or local structure of an object in the second image (which is a super-resolution version of the first image) should be generated from small or sparse details or local structure of the same object in the original lower-resolution first image, rather than from noise. Since noise is generally random in every image, if the details of an object in the second image are generated based on noise, the additional details of the object in the second image would differ significantly from the details of the same object in the third image (which is an upscaled or higher-resolution version of the first image). As a result, one or more areas where flicker may occur can be identified using the second and third images without relying on an estimation of motion between different images. Moreover, since motion estimation may not be needed here, there may be no concern about inaccurate motion estimation creating additional artifacts or failing to allow flicker compensation. In addition, since frequency decomposition and blending of the first and second decomposed images can be performed, it is possible to preserve at least some of the additional details from the second image in the flicker-suppressed image that is generated. This allows the flicker-suppressed image to retain a higher level of detail compared to the original first image.

Note that the various embodiments discussed below can be used in any suitable devices and in any suitable systems. Example devices in which the various embodiments discussed below may be used include various consumer electronic devices, such as smartphones, tablet computers, and televisions. However, it will be understood that the principles of this disclosure may be implemented in any number of other suitable contexts.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may perform various functions related to flicker suppression without motion estimation for single-image super-resolution. For instance, the processor 120 may process images and super-resolution versions of those images to perform flicker detection, and the processor 120 may perform frequency decomposition and blending to generate flicker-suppressed images.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for flicker suppression without motion estimation for single-image super-resolution. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform various functions related to flicker suppression without motion estimation for single-image super-resolution. For instance, the server 106 may process images and super-resolution versions of those images to perform flicker detection, and the server 106 may perform frequency decomposition and blending to generate flicker-suppressed images.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
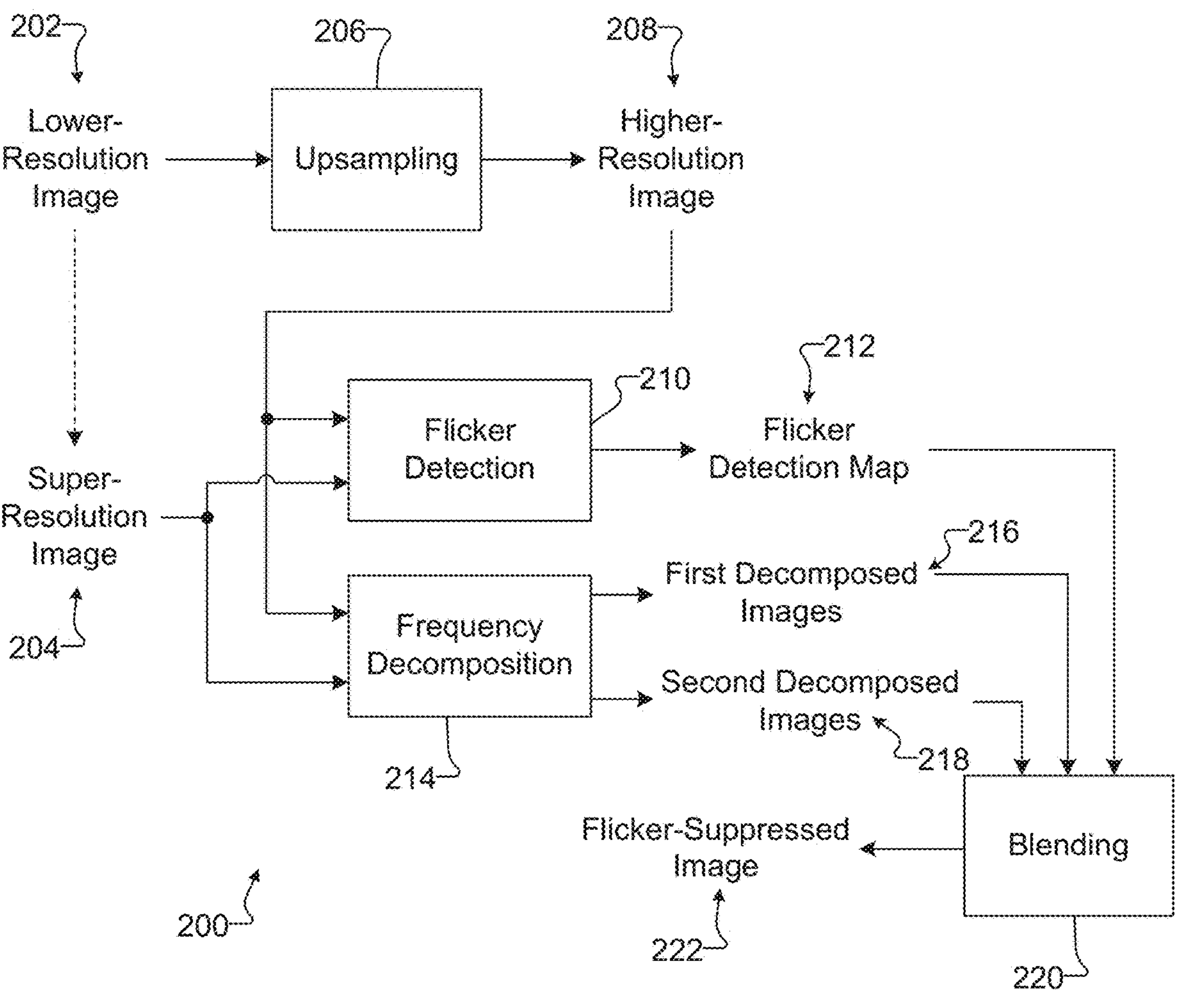
FIG. 2 illustrates an example architecture for flicker suppression without motion estimation for single-image super-resolution in accordance with this disclosure.

FIG. 2 illustrates an example architecture 200 for flicker suppression without motion estimation for single-image super-resolution in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 generally receives and processes at least one lower-resolution image 202 and at least one corresponding super-resolution image 204. The dashed line between the lower-resolution image 202 and the super-resolution image 204 in FIG. 2 indicates that the super-resolution image 204 represents a super-resolution version of the associated lower-resolution image 202. Each lower-resolution image 202 may be obtained from any suitable source. For example, each lower-resolution image 202 may be obtained using at least one camera or other imaging sensor 180 of the electronic device 101 during an image capture operation. In some cases, the image capture operation may represent a capture of a stream of images, such as a video sequence. As another example, each lower-resolution image 202 may be obtained from a stream of images obtained from an external source, such as when the stream of images is obtained by a television from a set-top box, TV box, gaming console, or DVD player. In general, this disclosure is not limited to any specific source of lower-resolution images 202.

Each lower-resolution image 202 can have any suitable format, such as a Bayer or other raw image format, a red-green-blue (RGB) image format, or a luma-chroma (YUV) image format. Each lower-resolution image 202 can also have any suitable resolution. Each super-resolution image 204 can also have any suitable format, and each super-resolution image 204 can have any suitable resolution that is higher than the corresponding lower-resolution image 202. Any suitable super-resolution technique may be used here to increase the resolution of a lower-resolution image 202 in order to generate a super-resolution image 204. In general, this disclosure is not limited to any specific technique for generating super-resolution images 204 based on lower-resolution images 202.

Each lower-resolution image 202 is provided to an upsampling operation 206, which generally operates to upsample or upscale the lower-resolution image 202 and generate a higher-resolution image 208. Each higher-resolution image 208 has a better resolution than the associated lower-resolution image 202. In some cases, each higher-resolution image 208 has a resolution that matches the resolution of the super-resolution image 204 generated using the associated lower-resolution image 202. The upsampling operation 206 may use any suitable technique to upsample or upscale lower-resolution images 202 and generate higher-resolution images 208. In some embodiments, for instance, the upsampling operation 206 may perform bicubic upsampling (also known as bicubic interpolation) or other interpolation technique.

Each higher-resolution image 208 and its corresponding super-resolution image 204 are provided to a flicker detection operation 210, which generally operates to process the higher-resolution image 208 and the super-resolution image 204 in order to identify one or more flicker regions. Each flicker region represents a portion of the super-resolution image 204 where one or more flicker artifacts may have been generated. The flicker detection operation 210 may use any suitable technique to compare images 204, 208 in order to identify regions where flicker artifacts may exist. The flicker detection operation 210 can generate a flicker detection map 212, which can identify which portions of the super-resolution image 204 (if any) are likely to suffer from flickering artifacts. For instance, the flicker detection map 212 may identify which pixels of the super-resolution image 204 (if any) are likely to suffer from flickering artifacts on a per-pixel basis.

In some embodiments, the flicker detection operation 210 analyzes a portion of a higher-resolution image 208 falling within a movable window and a portion of a corresponding super-resolution image 204 falling within the same movable window. As part of this analysis, the flicker detection operation 210 can generate a histogram of oriented gradients for the image data in the portion of the higher-resolution image 208 falling within the movable window and a histogram of oriented gradients for the image data in the portion of the super-resolution image 204 falling within the movable window. By comparing the histograms of oriented gradients, the flicker detection operation 210 can determine whether part of the super-resolution image 204 falling within the movable window is likely to suffer from flickering artifacts.

As described above, the flicker detection operation 210 may operate based on the observation that more flickering is generated when the local image structures in a super-resolution image 204 and a corresponding higher-resolution image 208 are less similar. Here, it may be assumed that larger differences between the local image structures in the super-resolution image 204 and the higher-resolution image 208 are the result of the process used to convert an original lower-resolution image 202 into a super-resolution image 204. In other words, details generated or enhanced in the super-resolution image 204 should be based on details that already exist in the lower-resolution image 202, even if those details in the lower-resolution image 202 are sparse. For the details that are generated or enhanced in the super-resolution image 204 based on the details in the lower-resolution image 202, the histograms of oriented gradients should be similar. This is because the details generated or enhanced in the super-resolution image 204 based on the details that already exist in the lower-resolution image 202 should have similar gradient orientations, and the histograms of oriented gradients are counting the orientations of the gradients in the super-resolution image 204 and the higher-resolution image 208. However, when details that are generated or enhanced in the super-resolution image 204 are not based on details in the lower-resolution image 202 and are instead based on factors such as noise (which can cause flickering), the histograms of oriented gradients for the super-resolution image 204 and the higher-resolution image 208 will be significantly different. By using the histograms of oriented gradients, the flicker detection operation 210 is therefore able to identify where flickering is likely to occur, and this can be accomplished without relying on any estimates of motion between images. Note, however, that other approaches relying on assumed relationships between contents of a super-resolution image 204 and its corresponding higher-resolution image 208 may be used by the flicker detection operation 210 to identify where flickering is likely to occur.

Each higher-resolution image 208 and its corresponding super-resolution image 204 are also provided to a frequency decomposition operation 214, which generally operates to decompose each image 204, 208 into a corresponding set of decomposed images. In this example, the frequency decomposition operation 214 can perform frequency decomposition to generate a first set of decomposed images 216 based on the higher-resolution image 208 and a second set of decomposed images 218 based on the super-resolution image 204. Each set of decomposed images 216, 218 can include image data associated with the respective image 208, 204 in multiple frequency bands, such as in low-, middle-, and high-frequency bands (each of which can span any suitable frequency range depending on the implementation). The frequency decomposition operation 214 may use any suitable technique to decompose images into multiple frequency bands, and any suitable number of frequency bands may be used here. In some embodiments, the frequency decomposition operation 214 may perform residual filtering, which involves decomposing an image 208, 204 into a low-frequency image and multiple residual images (such as a low-frequency residual image, a middle-frequency residual image, and a high-frequency residual image). Ideally, an original image 208 or 204 that is decomposed can be reconstructed completely or substantially by summing the low-frequency image and the multiple residual images for that image.

The flicker detection map 212 and the sets of decomposed images 216 and 218 for each pair of images 202 and 204 are provided to a blending operation 220, which generally operates to blend portions of the decomposed images 216 and 218 in order to generate a flicker-suppressed image 222. Ideally, the flicker-suppressed image 222 represents a version of the super-resolution image 204 that lacks at least some of the flicker artifacts contained in the super-resolution image 204. In some embodiments, the flicker-suppressed image 222 represents an image having the same resolution as the corresponding super-resolution image 204 while lacking at least some of the flicker artifacts from the super-resolution image 204. The blending operation 220 can use any suitable technique to blend portions of the decomposed images 216 and 218. For example, the blending operation 220 can use the flicker detection map 212 to identify which portions of the corresponding super-resolution image 204 are likely to suffer from flickering. For portions of the corresponding super-resolution image 204 that are not likely to suffer from flickering, the blending operation 220 may combine the image data in the decomposed images 218 (thereby essentially reconstructing those portions of the super-resolution image 204 in the flicker-suppressed image 222) while performing little or no blending with the image data in the decomposed images 216. This can help to incorporate the improved details present in the super-resolution image 204 into the flicker-suppressed image 222.

For portions of the corresponding super-resolution image 204 that are likely to suffer from flickering, the blending operation 220 may combine the image data from both sets of decomposed images 216, 218. This blending combines image data in portions of the super-resolution image 204 that are likely to suffer from flickering with image data in the same portions of the corresponding higher-resolution image 208. These portions of the corresponding higher-resolution image 208 are not likely to suffer from flickering since it can be assumed here that the super-resolution process creates the flickering artifacts. Since the images 208, 204 are decomposed into the sets of decomposed images 216, 218, the blending operation 220 can combine or use different frequency components of the images 208, 204 in different ways, which can help to reduce or eliminate the creation of flickering as perceived by humans. As a particular example, it has been determined that flickering in the low- and possibly middle-frequency ranges can be more easily perceived by people than flickering in the high-frequency range. Thus, some embodiments of the blending operation 220 may combine the sets of decomposed images 216, 218 so that the low- and possibly middle-frequency contents from the decomposed images 216, 218 are blended (since the higher-resolution image 208 used to generate the decomposed images 216 may contain no flicker) while the high-frequency contents from the decomposed images 218 are used with little or no blending. Among other things, this can allow details generated or enhanced in the super-resolution image 204 to remain in the flicker-suppressed image 222 while still perceptually suppressing flicker in the flicker-suppressed image 222.

Note that the architecture 200 described above can be used with any desired super-resolution technique at any desired image scale because the architecture 200 can utilize two images to suppress flicker. Other approaches that provide flicker suppression related to super-resolution are often based on deep neural networks. Training these deep neural networks may require large amounts of training data and large amounts of time so that the deep neural networks can be trained to suppress flickering while still retaining finer details in super-resolution images. However, any significant flicker or detail loss in a trained deep neural network typically requires a complete retraining of the deep neural network with more training data. Also, flickering can occur at different scales, and these deep neural networks typically need to be trained and retrained using one or more datasets at each of the different scales. In addition, these deep neural networks can be large, require lengthy processing times, and require the processing of images in sequence to estimate motion. The architecture 200 described above can overcome these or other issues since the architecture 200 does not require training on large datasets to suppress flicker in support of super-resolution.

The following now describes how various operations in the architecture 200 may operate in specific embodiments of this disclosure. The following details are for illustration and explanation only and do not limit the scope of this disclosure to these specific embodiments or details. In the following discussion, a lower-resolution image 202 received at time t is denoted as $$I_{LR}^t,$$

and its corresponding super-resolution image 204 is denoted as $$I_{SR}^t.$$

The upsampling operation 206 can perform bicubic upsampling or other upsampling to generate a higher-resolution image 208, which is denoted as $$I_{LR\text{-}up}^t.$$

The higher-resolution image 208 may have the same resolution as the super-resolution image 204. The flicker detection operation 210 processes the super-resolution image 204 and the higher-resolution image 208 to generate a flicker detection map 212, which is denoted as $F_{det}$. The frequency decomposition operation 214 processes the super-resolution image 204 and the higher-resolution image 208 to generate (i) a set of decomposed images 216 denoted as $$Decomp^l\left(I_{LR\text{-}up}^t\right)$$

based on the higher-resolution image 208 and (ii) a set of decomposed images 218 denoted as $$Decomp^l(I_{SR}^t)$$

based on the super-resolution image 204. The blending operation 220 blends portions of at least some of the decomposed images 216, 218 based on the flicker detection map 212 to generate a flicker-suppressed image 222, which is denoted as $$I^t_{SR\text{-}final}.$$

Note that, in particular embodiments, the image data of the lower-resolution image 202 and the super-resolution image 204 being used here can represent luminance (Y) image data, such as when the images 202 and 204 contain image data in the YUV domain. Also note that this process can be repeated across any number of lower-resolution images 202 and their associated super-resolution images 204.

The flicker detection operation 210 can compare local image structures between the super-resolution image 204

$$(I^t_{SR})$$

and the higher-resolution image 208

$$(I^t_{LR\text{-}up}).$$

In some embodiments, to compare the local image structures, the flicker detection operation 210 can generate a histogram of oriented gradients for each pixel of the image $$I^t_{SR}$$

and for each pixel of the image $$I^t_{LR\text{-}up}.$$

For example, for each pixel in the images $$I^t_{SR}$$

and $$I^t_{LR-up},$$

the flicker detection operation 210 can define a moveable window that includes the pixel and that has dimensions of $K_1 \times K_2$, where $K_1$ represents the horizontal dimension of the window in pixels and $K_2$ represents the vertical dimension of the window in pixels. The values for $K_1$ and $K_2$ can be selected in any suitable manner, such as when the values are fixed or adjustable based on any suitable criteria, and these two values may or may not be equal. The flicker detection operation 210 can calculate a histogram of oriented gradients for a pixel in the moveable window, such as for the pixel at the center of the moveable window. The histogram of oriented gradients can be weighted by the magnitude of the gradient within the moveable window. This can be done for each pixel in each image $$I^t_{SR}$$

and $$I^t_{LR-up},$$

and the resulting histograms of oriented gradients can be compared to determine if the local image structures in the images $$I^t_{SR}$$

and $$I^t_{LR-up}$$

are similar. In particular embodiments, the histogram of oriented gradients for image data in a moveable window can be determined as follows.

$$L_{low} \le \tan^{-1}\left(\frac{dy}{dx}\right) < L_{high}\left(L_{low,high} = \frac{\pi}{9}, \frac{2\pi}{9}, \cdots\right) \Longrightarrow \sqrt{dx^2 + dy^2}$$

In other particular embodiments, this equation can be simplified into the following form.

$$L'_{low} \cdot dx \le dy < L'_{high} \cdot dx \text{ for } dx \ge 0 \Longrightarrow (|dx| + |dy|)$$
$$L'_{low} \cdot dx \ge dy > L'_{high} \cdot dx \text{ for } dx < 0 \Longrightarrow (|dx| + |dy|)$$

Figure 3A:
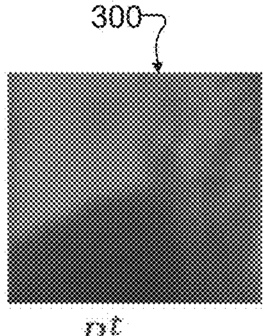
FIGS. 3A and 3B illustrate example histograms of oriented gradients that may be generated using the architecture of FIG. 2 in accordance with this disclosure.
Figure 3A:
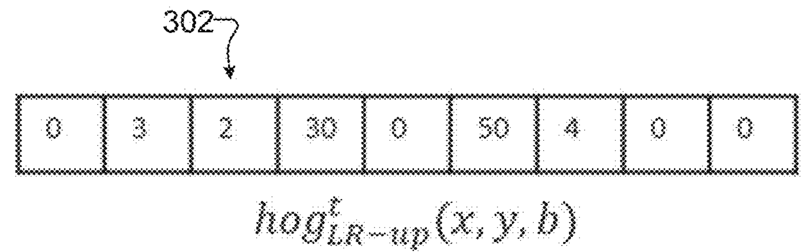
Figure 3B:
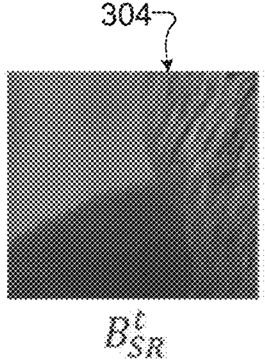
Figure 3B:
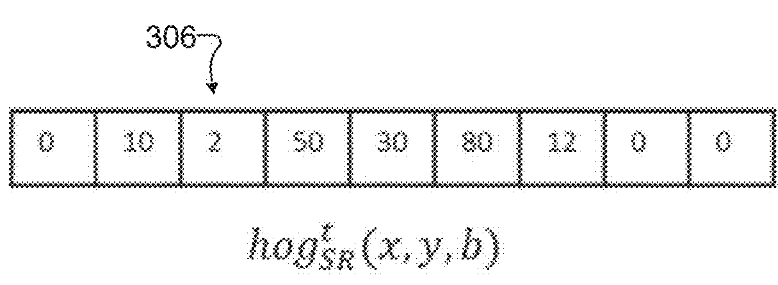

In some cases, $L'_{low}=\tan(L_{low})$ and $L'_{high}=\tan(L_{high})$, and both may be pre-computed. FIGS. 3A and 3B illustrate example histograms of oriented gradients that may be generated using the architecture 200 of FIG. 2 in accordance with this disclosure. As shown in FIG. 3A, a small patch 300 of a higher-resolution image 208 (denoted as $$B^t_{LR-up})$$

is shown, along with a histogram of oriented gradients 302 calculated for that patch 300. Similarly, as shown in FIG. 3B, a small patch 304 of a super-resolution image 204 (denoted $$B^t_{SR})$$

is shown, along with a histogram of oriented gradients 306 calculated for that patch 304. Values in the histogram of oriented gradients 302 can be denoted as $$hog^t_{LR-up}(x, y, b),$$

and values in the histogram of oriented gradients 306 can be denoted as $$hog_{SR}^{t}(x, y, b).$$

Here, x and y represent the location of the pixel for which the histogram is generated, and b represents a bin index within the histogram. Based on the determined histograms of oriented gradients, the flicker detection operation 210 can generate a value in the flicker detection map 212 for the pixel at location (x, y), such as in the following manner.

$$F_{\det}(x, y) = \frac{w_{\det}}{9}\left(\sum_{b=1}^{9} I(\text{hog}_{SR}^{t}(x, y, b) > T_s) - \sum_{b=1}^{9} I(\text{hog}_{LR-up}^{t}(x, y, b) > T_s)\right)$$

The value of "9" in this equation is based on the fact that the histograms of oriented gradients 302, 306 in this example include nine bins, although other numbers of bins may be used, and this equation can be updated accordingly. Here, the gradient magnitude can be magnified in the super-resolution image 204, so the histograms of oriented gradients 302, 306 are not directly compared. Instead, an indicator function can be used to measure the degree of local structure complexity, such as when the following indicator function is used.

$$I(x) = \begin{cases} 1 \text{ for } x \text{ is true} \\ 0 \text{ for } x \text{ is false} \end{cases}$$

Also, $T_s$ is a threshold value used to filter out noise and measure meaningful textures or edges, and $w_{det}$ is a parameter used to control a strength of detection value. This approach can be used to generate a value for each pixel of the flicker detection map 212.

The frequency decomposition operation 214 decomposes the higher-resolution image 208

$$(I_{LR-up}^{t})$$

to generate the decomposed images 216

$$(Decomp^{l}(I_{LR-up}^{t}))$$

and decomposes the super-resolution image 204 to generate the decomposed images 218

$$(Decomp^{l}(I_{SR}^{t})).$$

This allows subsequent blending of image data in different frequency bands based on the flicker detection map 212 in order to preserve at least some of the details in the super-resolution image 204. In some embodiments, the frequency decomposition operation 214 may perform residual filtering in order to decompose each of the images 204, 208, which may be useful in various implementations (such as when residual filtering is already implemented for other purposes). In some cases, the residual filtering may be performed as follows. Given an image $I^t$ (either the image 204 or the image 208) and multiple sigma values $\theta_l$, $\theta_m$, and $\theta_h$, a low-frequency image and multiple frequency residual images may be determined as follows.

$$\text{Low-frequency image}: I_l^t = G_{\theta_l}(I^t)$$

$$\text{Low-frequency residual image}: R_l^t = G_{\theta_m}(I^t) - G_{\theta_l}(I^t)$$

$$\text{Middle-frequency residual image}: R_m^t = G_{\theta_h}(I^t) - G_{\theta_m}(I^t)$$

$$\text{High-frequency residual image}: R_h^t = I^t - G_{\theta_h}(I^t)$$

Here, $G_{\theta_l}(\bullet)$, $G_{\theta_m}(\bullet)$, and $G_{\theta_h}(\bullet)$ represent Gaussian smooth filtering based on the various sigma values $\theta_l$, $\theta_m$, and $\theta_h$. Using these images, the following decomposition structure can be used to represent the image $I^t$.

$$Decomp^0(I^t) = I_l^t$$

$$Decomp^1(I^t) = R_l^t$$

$$Decomp^2(I^t) = R_m^t$$

$$Decomp^3(I^t) = R_h^t$$

Based on this, it is possible to substantially or completely reconstruct the image $I^t$ by determining $$I^t = \Sigma_{l=0}^{3} Decomp^l(I^t).$$

The blending operation 220 can blend the super-resolution image 204 and the higher-resolution image 208 by combining the sets of decomposed images 216, 218 based on the flicker detection map 212. In some embodiments, the blending operation 220 can blend the decomposed images 216, 218 as follows. A blending weight $W_{flicker}$ can be determined for each pixel location based on the flicker detection map 212 ($F_{det}$), such as in the following manner.

$$W_{flicker} = Clip(F_{\det} * s_{flicker}, 0, 1)$$

Here, $s_{flicker}$ represents a tunable parameter that may be used to adjust the strength of the flicker detection map 212. In some cases, the tunable parameter may be set by a user based on a desired amount of flicker suppression or set automatically based on the user's desired amount of flicker suppression. As a particular example, $s_{flicker}$ may have a value up to two, although other values or ranges may be used. Blending of the various decomposed images 216, 218 using the blending weight may be performed in the following manner.

$$I_{SR-final}^{t} = \sum_{l=0}^{3} B(l)$$

-continued $$B(l)=\begin{cases} W_{flicker}\times Decomp^{l}(I^{t}_{LR-up})+(1-W_{flicker})\times Decomp^{l}(I^{t}_{SR}) & \text{if } l\in l_{select} \\ Decomp^{l}(I^{t}_{SR}) & \text{otherwise} \end{cases}$$

Here, the blending weight $W_{flicker}$ is used to blend a decomposed image 216 and a decomposed image 218 at each of one or more decomposition levels $Decomp^l$ if l is a member of $l_{select}$. Otherwise, the decomposed image 218 is used without blending at each of one or more decomposition levels $Decomp^l$ if l is not a member of $I_{select}$. In some cases, $l_{select}=\{0\}$, which means that the blending operation 220 blends the decomposed image 216 and the decomposed image 218 for the lowest decomposition level $Decomp^0$ only, while the decomposed images 218 for all other decomposition levels are used without blending. However, the definition of $l_{select}$ may vary as needed or desired. As noted above, in some cases, the image data of the lower-resolution image 202 and the super-resolution image 204 being processed here can represent luminance image data. In those cases, the blending results produced by the blending operation 220 may include luminance image data only, and the blending results can be combined with chrominance data from the super-resolution image 204 in order to produce a complete YUV image (which may also be converted into an RGB image or other suitable image as needed or desired).

Although FIG. 2 illustrates one example of an architecture 200 for flicker suppression without motion estimation for single-image super-resolution, various changes may be made to FIG. 2. For example, various components and functions in FIG. 2 may be combined, further subdivided, replicated, or rearranged according to particular needs. Also, one or more additional components and functions may be included if needed or desired. In addition, the images 202 and 204 may be subjected to any desired pre-processing operation(s) prior to processing by the architecture 200, and the images 222 may be subjected to any desired post-processing operation(s) after generation by the architecture 200. Although FIGS. 3A and 3B illustrate examples of histograms of oriented gradients that may be generated using the architecture 200 of FIG. 2, various changes may be made to FIGS. 3A and 3B. For instance, the image data being processed by the architecture 200 can vary widely, so the patches of image data being processed and the resulting histograms of oriented gradients can also vary widely based on the circumstances.

Figure 4A:
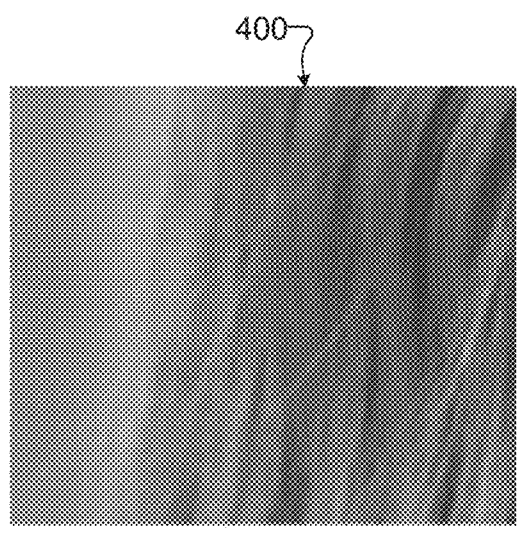
FIGS. 4A through 4D illustrate example results that may be obtained using the architecture of FIG. 2 in accordance with this disclosure.
Figure 4A:
Figure 4B:
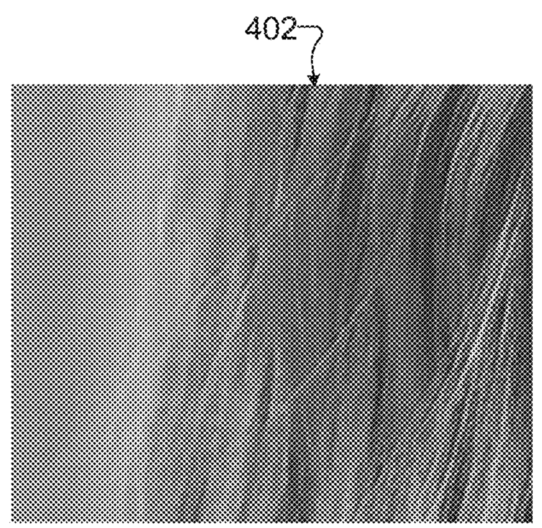
Figure 4C:
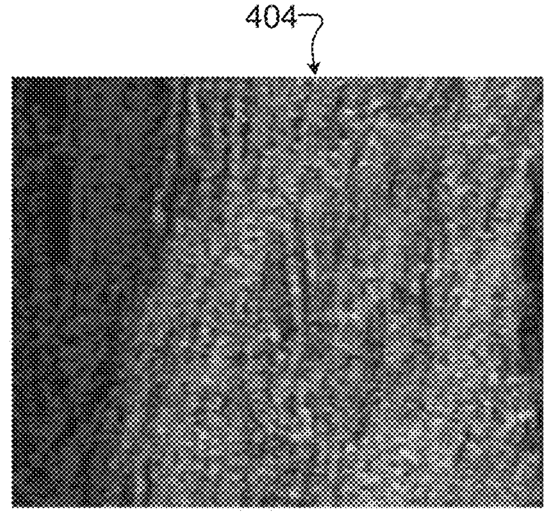

FIGS. 4A through 4D illustrate example results that may be obtained using the architecture 200 of FIG. 2 in accordance with this disclosure. As shown in FIG. 4A, an image 400 represents an example of a portion of a lower-resolution image 202. As shown in FIG. 4B, an image 402 represents an example of a portion of a super-resolution image 204. The image 402 may be generated based on the image 400 using any suitable super-resolution technique. By upsampling the image 400 and comparing local structures of the upsampled version of the image 400 and the image 402 (such as by using their histograms of oriented gradients), a flicker detection map 404 as shown in FIG. 4C can be generated. In this example, the flicker detection map 404 identifies on a per-pixel basis which pixels of the image 402 may suffer from flickering artifacts.

Figure 4D:
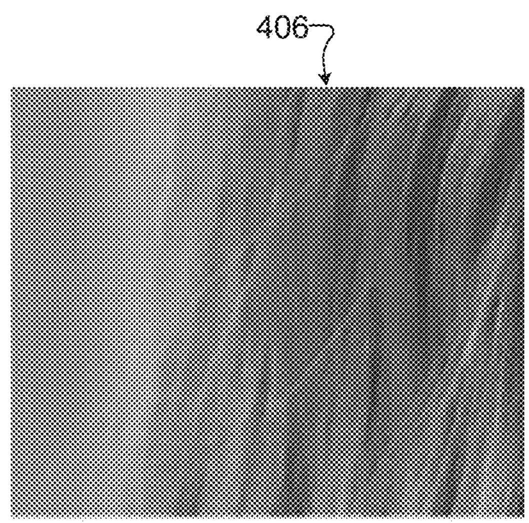

The blending operation 220 can use the flicker detection map 404 to combine decomposed images 216 of the upsampled version of the image 400 and decomposed images 218 of the image 402. For example, the blending operation 220 can determine a blending weight based on the flicker detection map 404 for each pixel location. The blending operation 220 can blend one or more of the decomposed images 216 and one or more of the decomposed images 218 at one or more lower decomposition levels, and the blending operation 220 can use one or more of the decomposed images 218 at one or more higher decomposition levels without blending. One example of the results of the blending is shown in FIG. 4D, which shows an image 406 that can represent a portion of a flicker-suppressed image 222. As can be seen here, the image 406 includes finer details compared to the original lower-resolution image 400, which indicates that the architecture 200 is able to suppress flickering while still retaining at least some of the added or enhanced details from the super-resolution image 402.

Although FIGS. 4A through 4D illustrate one example of results that may be obtained using the architecture 200 of FIG. 2, various changes may be made to FIGS. 4A through 4D. For example, the actual contents of images can vary widely, and FIGS. 4A through 4D do not limit the scope of this disclosure to any particular type of image contents.

Figure 5:
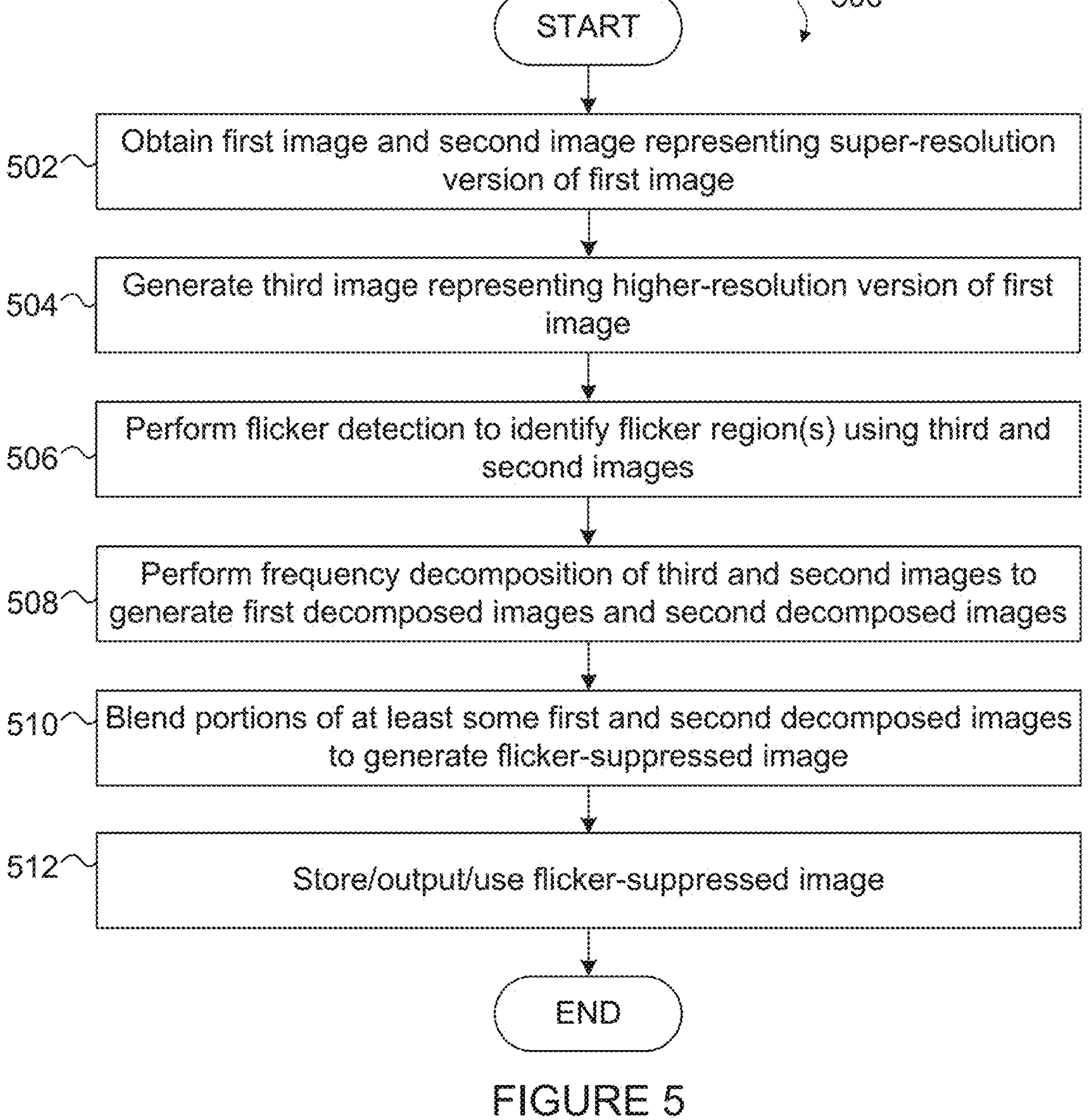
FIG. 5 illustrates an example method for flicker suppression without motion estimation for single-image super-resolution in accordance with this disclosure.

FIG. 5 illustrates an example method 500 for flicker suppression without motion estimation for single-image super-resolution in accordance with this disclosure. For ease of explanation, the method 500 shown in FIG. 5 is described as being performed by the electronic device 101 in the network configuration 100 of FIG. 1, where the electronic device 101 can implement the architecture 200 shown in FIG. 2. However, the method 500 shown in FIG. 5 could be performed by any other suitable device(s) and in any other suitable system(s), such as when the method 500 is performed using the server 106.

As shown in FIG. 5, a first image and a second image are obtained, where the second image represents a super-resolution version of the first image, at step 502. This may include, for example, the processor 120 of the electronic device 101 obtaining the first image (such as a lower-resolution image 202) from any suitable source and obtaining the second image (such as a super-resolution image 204) generated using a super-resolution technique. In some cases, the processor 120 itself can perform the super-resolution technique and generate the second image. A third image representing a higher-resolution version of the first image is generated at step 504. This may include, for example, the processor 120 of the electronic device 101 performing the upsampling operation 206 to convert the first image into the third image (such as a higher-resolution image 208).

Flicker detection is performed to identify any flicker regions using the third and second images at step 506. This may include, for example, the processor 120 of the electronic device 101 performing the flicker detection operation 210 in order to identify one or more flicker regions, which represent one or more areas where flicker artifacts may be present in the second image. As described above, the flicker detection operation 210 can compare local structures of the third and second images in order to identify the flicker regions(s). As a particular example, the flicker detection operation 210 can generate histograms of oriented gradients at each pixel of the third and second images and compare the histograms of oriented gradients at common pixel locations of the third and second images. In some cases, the flicker detection operation 210 can generate a flicker detection map 212 identifying where flicker artifacts may be present in the second image.

Frequency decomposition of the third image is performed to generate a first set of decomposed images, and frequency decomposition of the second image is performed to generate a second set of decomposed images at step 508. This may include, for example, the processor 120 of the electronic device 101 performing the frequency decomposition operation 214 to generate a first set of decomposed images 216 representing the third image and a second set of decomposed images 218 representing the second image. In some cases, residual filtering can be used to generate different decomposed images at different decomposition levels.

Portions of the first and second decomposed images are blended based on the results of the flicker detection to generate a flicker-suppressed image at step 510. This may include, for example, the processor 120 of the electronic device 101 performing the blending operation 220 to blend certain ones of the decomposed images 216, 218 at locations where the flicker detection map 212 indicates flicker artifacts may be present. This may also include the performing the blending operation 220 to use certain ones of the decomposed images 218 without blending at locations where the flicker detection map 212 does not indicate flicker artifacts may be present. This results in the generation of a flicker-suppressed image 222. The flicker-suppressed image is stored, output, or used in some manner at step 512. For example, the flicker-suppressed image 222 may be displayed on the display 160 of the electronic device 101, saved to a camera roll stored in a memory 130 of the electronic device 101, or attached to a text message, email, or other communication to be transmitted from the electronic device 101. Of course, the flicker-suppressed image 222 could be used in any other or additional manner.

Although FIG. 5 illustrates one example of a method 500 for flicker suppression without motion estimation for single-image super-resolution, various changes may be made to FIG. 5. For example, while shown as a series of steps, various steps in FIG. 5 may overlap, occur in parallel, occur in a different order, or occur any number of times.

It should be noted that the functions shown in or described with respect to FIGS. 2 through 5 can be implemented in an electronic device 101, server 106, or other device(s) in any suitable manner. For example, in some embodiments, at least some of the functions shown in or described with respect to FIGS. 2 through 5 can be implemented or supported using one or more software applications or other software instructions that are executed by the processor 120 of the electronic device 101, server 106, or other device(s). In other embodiments, at least some of the functions shown in or described with respect to FIGS. 2 through 5 can be implemented or supported using dedicated hardware components. In general, the functions shown in or described with respect to FIGS. 2 through 5 can be performed using any suitable hardware or any suitable combination of hardware and software/firmware instructions. Also, the functions shown in or described with respect to FIGS. 2 through 5 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining, using at least one processing device of an electronic device, a first image and a second image, the second image representing a super-resolution version of the first image;

generating, using the at least one processing device, a third image representing a higher-resolution version of the first image;

performing, using the at least one processing device, flicker detection based on the third image and the second image in order to identify one or more flicker regions;

performing, using the at least one processing device, frequency decomposition of the third image to generate first decomposed images and of the second image to generate second decomposed images, wherein the first decomposed images comprise:

first image data associated with the third image in multiple frequency bands; and a first low-frequency image and multiple first residual images based on the third image; and blending, using the at least one processing device, portions of at least some of the first and second decomposed images based on the one or more identified flicker regions to generate a flicker-suppressed image.

2. The method of claim 1, wherein performing the flicker detection comprises performing the flicker detection without using motion information between different images.

3. The method of claim 1, wherein performing the flicker detection comprises using a first histogram of oriented gradients associated with the third image and a second histogram of oriented gradients associated with the second image.

4. The method of claim 1, wherein blending the portions of at least some of the first and second decomposed images based on the one or more identified flicker regions causes the flicker-suppressed image to retain at least some details of the second image not present in the third image.

5. The method of claim 1, wherein the second decomposed images comprise second image data associated with the second image in the multiple frequency bands.

6. The method of claim 5, wherein the second decomposed images comprise a second low-frequency image and multiple second residual images based on the second image, different ones of the second residual images associated with different ones of the multiple frequency bands.

7. The method of claim 1, wherein:

generating the third image comprises applying bicubic upsampling to the first image; and a resolution of the third image matches a resolution of the second image.

8. An electronic device comprising:

at least one processing device configured to:

obtain a first image and a second image, the second image representing a super-resolution version of the first image;

generate a third image representing a higher-resolution version of the first image;

perform flicker detection based on the third image and the second image in order to identify one or more flicker regions;

perform frequency decomposition of the third image to generate first decomposed images and of the second image to generate second decomposed images, wherein the first decomposed images comprise:

first image data associated with the third image in multiple frequency bands; and a first low-frequency image and multiple first residual images based on the third image; and blend portions of at least some of the first and second decomposed images based on the one or more identified flicker regions to generate a flicker-suppressed image.

9. The electronic device of claim 8, wherein the at least one processing device is configured to perform the flicker detection without using motion information between different images.

10. The electronic device of claim 8, wherein, to perform the flicker detection, the at least one processing device is configured to use a first histogram of oriented gradients associated with the third image and a second histogram of oriented gradients associated with the second image.

11. The electronic device of claim 8, wherein the at least one processing device is configured to blend the portions of at least some of the first and second decomposed images based on the one or more identified flicker regions so that the flicker-suppressed image retains at least some details of the second image not present in the third image.

12. The electronic device of claim 8, wherein the second decomposed images comprise second image data associated with the second image in the multiple frequency bands.

13. The electronic device of claim 12, wherein the second decomposed images comprise a second low-frequency image and multiple second residual images based on the second image, different ones of the second residual images associated with different ones of the multiple frequency bands.

14. The electronic device of claim 8, wherein:

the at least one processing device is configured to apply bicubic upsampling to the first image in order to generate the third image; and a resolution of the third image matches a resolution of the second image.

15. A non-transitory machine readable medium containing instructions that when executed cause at least one processor of an electronic device to:

obtain a first image and a second image, the second image representing a super-resolution version of the first image;

generate a third image representing a higher-resolution version of the first image;

perform flicker detection based on the third image and the second image in order to identify one or more flicker regions;

perform frequency decomposition of the third image to generate first decomposed images and of the second image to generate second decomposed images, wherein the first decomposed images comprise:

first image data associated with the third image in multiple frequency bands; and a first low-frequency image and multiple first residual images based on the third image; and blend portions of at least some of the first and second decomposed images based on the one or more identified flicker regions to generate a flicker-suppressed image.

16. The non-transitory machine readable medium of claim 15, wherein the instructions that when executed cause the at least one processor to perform the flicker detection comprise:

instructions that when executed cause the at least one processor to perform the flicker detection without using motion information between different images.

17. The non-transitory machine readable medium of claim 15, wherein the instructions that when executed cause the at least one processor to perform the flicker detection comprise:

instructions that when executed cause the at least one processor to use a first histogram of oriented gradients associated with the third image and a second histogram of oriented gradients associated with the second image.

18. The non-transitory machine readable medium of claim 15, wherein the instructions that when executed cause the at least one processor to blend the portions of at least some of the first and second decomposed images comprise:

instructions that when executed cause the at least one processor to blend at least some of the first and second decomposed images based on the one or more identified flicker regions so that the flicker-suppressed image retains at least some details of the second image not present in the third image.

19. The non-transitory machine readable medium of claim 15, wherein:

the second decomposed images comprise second image data associated with the second image in the multiple frequency bands; and the second decomposed images comprise a second low-frequency image and multiple second residual images based on the second image, different ones of the second residual images associated with different ones of the multiple frequency bands.

20. The non-transitory machine readable medium of claim 15, wherein:

the instructions that when executed cause the at least one processor to generate the third image comprise instructions that when executed cause the at least one processor to apply bicubic upsampling to the first image; and a resolution of the third image matches a resolution of the second image.

* * * * *